(12) United States Patent
Imai et al.

(10) Patent No.: US 6,838,843 B2
(45) Date of Patent: Jan. 4, 2005

(54) CONTROLLER FOR DC BRUSHLESS MOTOR

(75) Inventors: Nobuyuki Imai, Saitama (JP); Yutaka Takahashi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/669,013

(22) Filed: Sep. 24, 2003

(65) Prior Publication Data

US 2004/0061469 A1 Apr. 1, 2004

(30) Foreign Application Priority Data

Sep. 24, 2002 (JP) ........................................ P.2002-277473

(51) Int. Cl.⁷ .............................................. H02P 6/14
(52) U.S. Cl. ...................... 318/254; 318/138; 318/439; 318/721
(58) Field of Search ............................... 318/254, 138, 318/439, 721

(56) References Cited

U.S. PATENT DOCUMENTS 5,635,810 A * 6/1997 Goel .......................... 318/719
5,689,165 A * 11/1997 Jones et al. ................. 318/701
6,005,364 A * 12/1999 Acarnley .................... 318/632
6,081,087 A * 6/2000 Iijima et al. ................ 318/439
6,157,150 A * 12/2000 Konecny .................... 318/254
6,462,491 B1 * 10/2002 Iijima et al. ................ 318/254
2002/0149335 A1 10/2002 Imai et al. .................. 318/494

* cited by examiner

*Primary Examiner*—Rita Leykin
(74) *Attorney, Agent, or Firm*—Arent Fox PLLC

(57) ABSTRACT

A motor controller implements alternately a feedback control for d axis current and a feedback control for q axis current using an estimate value of a rotor angle in different control cycles. Then, the motor controller calculates a sine reference value which corresponds to a sine value of an angle which is twice a phase difference between an actual value and an estimate value of a rotor angle and a cosine reference value which corresponds to a cosine value of the angle which is twice the phase difference based on variations of the d axis actual current and q axis actual current and levels of d axis voltage and q axis voltage in a control cycle in which feedback controls are implemented for d axis current and q axis current and detects a rotor angle using the sine reference value and the cosine reference value so calculated.

4 Claims, 3 Drawing Sheets

CONTROLLER FOR DC BRUSHLESS MOTOR

BACKGROUND OF THE INVENTION

1. Field of the Invention

The present invention relates to a controller for a DC brushless motor which can detects the rotor angle of a DC brushless motor without using a rotor position detecting sensor and control the operation of the motor.

2. Description of the Related Art

In order to obtain a desired torque by energizing a DC brushless motor, a voltage needs to be applied to an armature in an appropriate phase which corresponds to an electrical angle (hereinafter, referred to as a rotor angle) of a rotor having magnetic poles. With a view to reducing costs for a DC brushless motor and a motor drive unit by omitting a position detecting sensor for detecting the rotor angle, there have been proposed many methods for detecting the rotor angle with using no position detecting sensor.

For example, Japanese Patent Unexamined Publication Nos. Hei. 10-323099 and Hei. 11-332279 describe methods for detecting the rotor angle of a DC brushless motor in a motor control apparatus for controlling such a DC brushless motor by a so-called dq coordinate system in which method an estimation alternating current signal voltage is applied in a direction of one of axes to thereby generate on the other axis side a current, by which the rotor angle is detected.

In addition, the inventor et al. of the present invention proposed, in US 2002/0149335A1, a rotor angle detecting apparatus for detecting the rotor angle using no position detecting sensor. In the rotor angle detecting apparatus, when a high-frequency voltage is imposed on a drive voltage which is applied to three phase armatures of a salient pole-type DC brushless motor, a detection value of a current flowing to a first-phase armature and a detection value of a current flowing to a second-phase armature of the three phase armatures and a high-frequency component corresponding to the high-frequency voltage are used to calculate a sine reference value corresponding to a sine value of an angle which is twice the rotor angle of the motor and a cosine reference value corresponding to a cosine value of an angle which is twice the rotor angle of the motor.

Then, the rotor angle can be detected based on the sine reference value and the cosine reference value with good initial follow-up characteristics and with being affected little by motor parameters.

However, when imposing the high-frequency voltage on the drive voltage in order to detect the rotor angle, there may occur a case where irksome noise is generated from the motor. In addition, in order to impose an alternating current signal voltage on a drive voltage, the capacity of an inverter for outputting a drive voltage to the motor needs to be increased. Furthermore, in order to prevent the interference of a response from the motor current feedback control system with a response from the rotor angle detection system, while the response from the current feedback control system needs to be separated from the response from the rotor angle detection system by a low-pass filter, there may be caused a risk that the provision of the low-pass filter deteriorates the response from the current feedback system.

SUMMARY OF THE INVENTION

The present invention was made in view of the background described above, and an object thereof is to provide a controller for a DC brushless motor, having a function to detect a rotor angle without using a position detecting sensor by resolving various problems that occur when detecting a rotor angle by imposing a high-frequency voltage on a drive voltage.

Figure 1A:
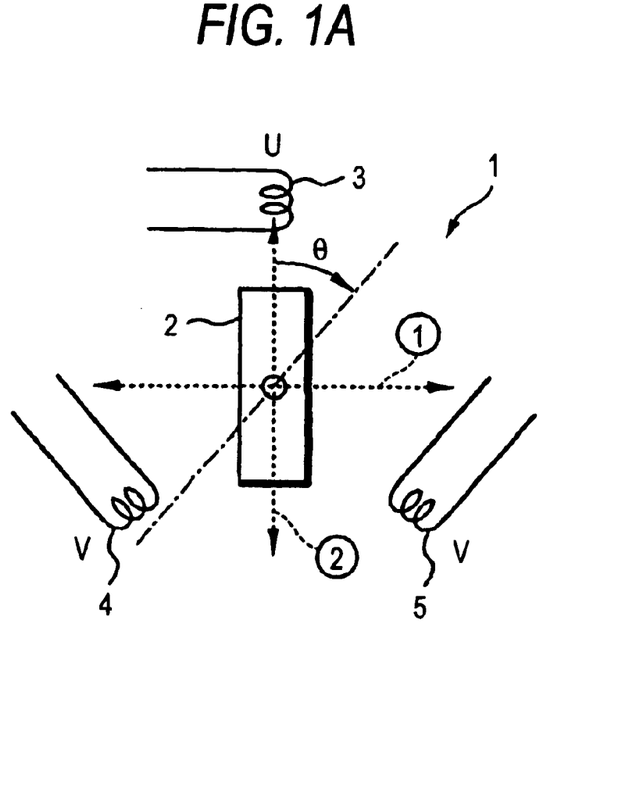
FIGS. 1A and 1B are diagrams showing the configuration of a DC brushless motor.

Firstly, before the invention is described, a fundamental concept of the invention is described by reference to FIGS. 1A and 1B. As shown in FIG. 1A, in a case where a salient pole-type rotor 2 is used, a magnetic reluctance in a gap between the rotor 2 and respective armatures 3, 4, 5 of U, V, W phases changes periodically as the rotor 2 rotates. When the rotor 2 makes one revolution, the magnetic reluctance changes in two periods, i.e., when the rotor 2 makes one half of a revolution, the magnetic reluctance changes for one period. In addition, the magnetic reluctance becomes maximum when the rotor 2 is situated at a position labeled as ① in the figure and becomes minimum when the rotor 2 is situated at a position labeled as ② in the figure.

Figure 1B:
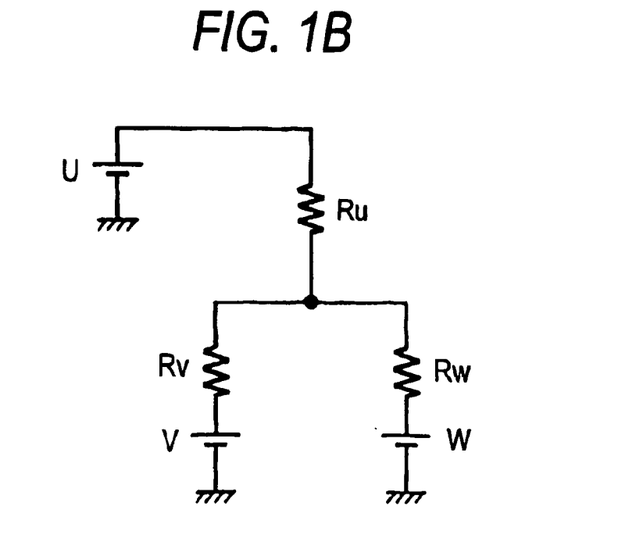

FIG. 1B is a diagram showing a typical magnetic circuit of FIG. 1A, and assume that an average value of the magnetic reluctance for one period is 0.5, then, magnetic reluctances Ru, Rv, Rw in the respective phases U, V, W are expressed by the following equations (8) to (10).

[Equation 8]

$$Ru = 1 - \cos 2\theta \tag{8}$$

[Equation 9]

$$Rv = 1 - \cos\left(2\theta + \frac{2}{3}\pi\right) \tag{9}$$

[Equation 10]

$$Rw = 1 - \cos\left(2\theta - \frac{2}{3}\pi\right) \tag{10}$$

As this occurs, the magnetic reluctance Rgu of the gap as viewed from the U phase can be obtained from the following equation (11).

[Equation 11]

$$\begin{aligned}
Rgu &= Ru + \frac{Rv \cdot Rw}{Rv + Rw} \\
&= 1 + \cos 2\theta + \frac{1 + \cos\left(2\theta - \frac{2}{3}\pi\right) + \cos\left(2\theta + \frac{2}{3}\pi\right) + \cos\left(2\theta - \frac{2}{3}\pi\right) \cdot \cos\left(2\theta + \frac{2}{3}\pi\right)}{2 + \cos\left(2\theta - \frac{2}{3}\pi\right) + \cos\left(2\theta + \frac{2}{3}\pi\right)} \\
&= 1 + \cos 2\theta + \frac{1 - \cos 2\theta + \frac{1}{2}\left(\cos 4\theta + \cos\frac{2}{3}\pi\right)}{2 - \cos 2\theta} \\
&= \frac{8 - \cos\frac{2}{3}\pi}{4 - 2\cos 2\theta}
\end{aligned} \tag{11}$$

Due to this, assume that the U phase is a unit winding, a self-inductance Lu of the U phase can be obtained by the following equation (12).

[Equation 12]

$$Lu = \frac{1}{Rgu} = \frac{4 - 2\cos 2\theta}{8 - \cos\frac{2}{3}\pi} \tag{12}$$

In addition, due to the configuration of the magnetic circuit, a mutual inductance Muw between the U and W phases and a mutual inductance Muv between the U and V phases can be obtained by the following equations (13), (14), respectively.

[Equation 13]
$$Muw = -\frac{Rw}{Rv+Rw}Lu = -\frac{2+2\cos\left(2\theta+\frac{2}{3}\pi\right)}{8-\cos\frac{2}{3}\pi} \quad (13)$$

[Equation 14]
$$Muv = -\frac{Rv}{Rv+Rw}Lu = -\frac{2+2\cos\left(2\theta-\frac{2}{3}\pi\right)}{8-\cos\frac{2}{3}\pi} \quad (14)$$

Similarly, self-inductances and mutual inductances of the V and W phases can be obtained, whereby, suppose that DC component of the self-inductance of each phase is 1, a variable of the DC component 1 is Δ1, and the DC component of the mutual inductance between each phase pair is m, a voltage equation of the salient poly-type DC brushless motor can be expressed by the following equation (15).

[Equation 15]
$$\begin{pmatrix} Vu \\ Vv \\ Vw \end{pmatrix} = r\begin{pmatrix} Iu \\ Iv \\ Iw \end{pmatrix} + \frac{d}{dt}$$

$$\begin{pmatrix} i-\Delta i\cos 2\theta & m-\Delta i\cos\left(2\theta-\frac{2}{3}\pi\right) & m-\Delta i\cos\left(2\theta+\frac{2}{3}\pi\right) \\ m-\Delta i\cos\left(2\theta-\frac{2}{3}\pi\right) & i-\Delta i\cos\left(2\theta+\frac{2}{3}\pi\right) & m-\Delta i\cos 2\theta \\ m-\Delta i\cos\left(2\theta+\frac{2}{3}\pi\right) & m-\Delta i\cos 2\theta & i-\Delta i\cos\left(2\theta-\frac{2}{3}\pi\right) \end{pmatrix}$$

$$\begin{pmatrix} Iu \\ Iv \\ Iw \end{pmatrix} + \omega Ke \begin{pmatrix} \sin\theta \\ \sin\left(\theta-\frac{2}{3}\pi\right) \\ \sin\left(\theta-\frac{4}{3}\pi\right) \end{pmatrix}$$

where, Vu, Vv, Vw denote voltages applied to the U phase, V phase and W phase armatures, respectively, Iu, Iv, Iw denote currents flowing to the U phase, V phase and W phase armatures, respectively, r denotes electric resistances of the U phase, V phase and W phase armatures, ω denotes the electric angular velocity of the rotor 2, and Ke denotes an induced voltage constant.

Furthermore, in the event that the electric angular velocity ω is substantially 0, influences by changes in induced voltage and angular velocity of the rotor 2 are small, and the voltage drop by the resistors r are negligible, the equation (15) can be approximated by the following equation (16).

[Equation 16]
$$\begin{pmatrix} Vu \\ Vv \\ Vw \end{pmatrix} \approx \begin{pmatrix} i-\Delta i\cos 2\theta & m-\Delta i\cos\left(2\theta-\frac{2}{3}\pi\right) & m-\Delta i\cos\left(2\theta+\frac{2}{3}\pi\right) \\ m-\Delta i\cos\left(2\theta-\frac{2}{3}\pi\right) & i-\Delta i\cos\left(2\theta+\frac{2}{3}\pi\right) & m-\Delta i\cos 2\theta \\ m-\Delta i\cos\left(2\theta+\frac{2}{3}\pi\right) & m-\Delta i\cos 2\theta & i-\Delta i\cos\left(2\theta-\frac{2}{3}\pi\right) \end{pmatrix}$$

$$\frac{d}{dt}\begin{pmatrix} Iu \\ Iv \\ Iw \end{pmatrix}$$

Here, in case the equation (16) is rearranged to an equation by inter-phase current and voltage, the following equation (17) can be obtained.

[Equation 17]

$$\begin{pmatrix} 1 & -1 & 0 \\ 1 & -1 & 1 \end{pmatrix} \begin{pmatrix} Vu \\ Vv \\ Vw \end{pmatrix} = \begin{pmatrix} Vu - Vv \\ Vw - Vv \end{pmatrix} \approx \begin{pmatrix} 1 & -1 & 0 \\ 1 & -1 & 1 \end{pmatrix}$$

$$\begin{pmatrix} l - \Delta l\cos 2\theta & m - \Delta l\cos\left(2\theta - \frac{2}{3}\pi\right) & m - \Delta l\cos\left(2\theta + \frac{2}{3}\pi\right) \\ m - \Delta l\cos\left(2\theta - \frac{2}{3}\pi\right) & l - \Delta l\cos\left(2\theta + \frac{2}{3}\pi\right) & m - \Delta l\cos 2\theta \\ m - \Delta l\cos\left(2\theta + \frac{2}{3}\pi\right) & m - \Delta l\cos 2\theta & l - \Delta l\cos\left(2\theta - \frac{2}{3}\pi\right) \end{pmatrix} \frac{d}{dt}\begin{pmatrix} Iu \\ Iv \\ Iw \end{pmatrix} =$$

$$\begin{pmatrix} l - m - \Delta l\{\cos 2\theta - \cos\left(2\theta - \frac{2}{3}\pi\right)\} & -l + m - \Delta l\{\cos\left(2\theta - \frac{2}{3}\pi\right) - \cos\left(2\theta - \frac{2}{3}\pi\right)\} & \Delta l\{\cos 2\theta - \cos\left(2\theta + \frac{2}{3}\pi\right)\} \\ \Delta l\{\cos\left(2\theta - \frac{2}{3}\pi\right) - \cos\left(2\theta + \frac{2}{3}\pi\right)\} & -l + m - \Delta l\{\cos 2\theta - \cos\left(2\theta + \frac{2}{3}\pi\right)\} & l - m + \Delta l\{\cos 2\theta - \cos\left(2\theta - \frac{2}{3}\pi\right)\} \end{pmatrix}$$

$$\begin{pmatrix} 1 & 0 \\ -1 & -1 \\ 0 & 1 \end{pmatrix} \frac{d}{dt}\begin{pmatrix} Iu \\ Iw \end{pmatrix} =$$

$$\begin{pmatrix} 2(l-m) - \Delta l\{\cos 2\theta - \cos\left(2\theta - \frac{2}{3}\pi\right) + \cos\left(2\theta + \frac{2}{3}\pi\right)\} & l - m + \Delta l\{\cos 2\theta + \cos\left(2\theta - \frac{2}{3}\pi\right) - 2\cos\left(2\theta + \frac{2}{3}\pi\right)\} \\ l - m + \Delta l\{\cos 2\theta + \cos\left(2\theta - \frac{2}{3}\pi\right) - 2\cos\left(2\theta + \frac{2}{3}\pi\right)\} & 2(l-m) + \Delta l\{2\cos 2\theta - \cos\left(2\theta - \frac{2}{3}\pi\right) - \cos\left(2\theta + \frac{2}{3}\pi\right)\} \end{pmatrix}$$

$$\frac{d}{dt}\begin{pmatrix} Iu \\ Iw \end{pmatrix} = \begin{pmatrix} 2(l-m) + 3\Delta l\cos\left(2\theta - \frac{2}{3}\pi\right) & l - m - 3\Delta l\cos\left(2\theta + \frac{2}{3}\pi\right) \\ l - m - 3\Delta l\cos\left(2\theta + \frac{2}{3}\pi\right) & 2(l-m) + 3\Delta l\cos 2\theta \end{pmatrix} \frac{d}{dt}\begin{pmatrix} Iu \\ Iw \end{pmatrix}$$

In addition, since the inductance matrix of the equation (17) is regular, the equation (17) can be rearranged to the following equations (18), (19).

[Equation 18]

$$\begin{pmatrix} \frac{d}{dt}Iu \\ \frac{d}{dt}Iw \end{pmatrix} = K \begin{pmatrix} 2(l-m) + 3\Delta l\cos 2\theta & -l + m + 3\Delta l\cos\left(2\theta + \frac{2}{3}\pi\right) \\ -l + m + 3\Delta l\cos\left(2\theta + \frac{2}{3}\pi\right) & 2(l-m) + 3\Delta l\cos\left(2\theta^1 - \frac{2}{3}\pi\right) \end{pmatrix}$$

$$\begin{pmatrix} Vu - Vv \\ Vw - Vv \end{pmatrix}$$

[Equation 19]

$$K = \frac{1}{\{2(l-m) + 3\Delta l\cos\left(2\theta - \frac{2}{3}\pi\right)\} \times \{2(l-m) + 3\Delta l\cos 2\theta\} - \{l - m - 3\Delta l\cos\left(2\theta + \frac{2}{3}\pi\right)\}^2}$$

In addition, a three phase/dq conversion expressed by the following equations (20), (21) using an estimate value ($\hat{\theta}$) of the rotor angle is applied to the equation (15), in case the estimate value ($\hat{\theta}$) and an actual value ($\theta$) of the rotor angle are equal to each other ($\hat{\theta}=\theta$), the following equation (22) can be obtained.

[Equation 20] (20)

$$\begin{pmatrix} \hat{V}d \\ \hat{V}q \end{pmatrix} = \frac{2}{3} \begin{pmatrix} \sin\theta & \sin\left(\theta - \frac{2}{3}\pi\right) & \sin\left(\theta - \frac{4}{3}\pi\right) \\ \cos\theta & \cos\left(\theta - \frac{2}{3}\pi\right) & \cos\left(\theta - \frac{4}{3}\pi\right) \end{pmatrix} \begin{pmatrix} Vu \\ Vv \\ Vw \end{pmatrix}$$

[Equation 21] (21)

$$\begin{pmatrix} \hat{I}d \\ \hat{I}q \end{pmatrix} = \frac{2}{3} \begin{pmatrix} \sin\theta & \sin\left(\theta - \frac{2}{3}\pi\right) & \sin\left(\theta - \frac{4}{3}\pi\right) \\ \cos\theta & \cos\left(\theta - \frac{2}{3}\pi\right) & \cos\left(\theta - \frac{4}{3}\pi\right) \end{pmatrix} \begin{pmatrix} Iu \\ Iv \\ Iw \end{pmatrix}$$

[Equation 22] (22)

$$\begin{pmatrix} \hat{V}d \\ \hat{V}q \end{pmatrix} = \begin{pmatrix} r + \frac{d}{dt}Ld & -\omega Lq \\ \omega Lq & r + \frac{d}{dt}Lq \end{pmatrix} \begin{pmatrix} \hat{I}d \\ \hat{I}q \end{pmatrix} + \begin{pmatrix} \omega Ke \\ 0 \end{pmatrix}$$

[Equation 23] (23)

$$Ld = 1 - m + \frac{3}{2}\Delta l$$

[Equation 24] (24)

$$Lq = 1 - m - \frac{3}{2}\Delta l$$

Here, in the event that the rotor angle (θ) in the equation (18) is an estimate value which shifts by θe from the actual value of the rotor angle, the following equations (25), (26) are established between Idˆ, Iqˆ, Vdˆ, Vqˆ which were three phase/dq converted using the estimate value and Id, Iq, Vd, Vq which were converted using the actual value of the rotor angle.

[Equation 25] (25)

$$\begin{pmatrix} \hat{I}d \\ \hat{I}q \end{pmatrix} = \begin{pmatrix} \cos\theta e & -\sin\theta e \\ \sin\theta e & \cos\theta e \end{pmatrix} \begin{pmatrix} Id \\ Iq \end{pmatrix}$$

[Equation 26] (26)

$$\begin{pmatrix} \hat{V}d \\ \hat{V}q \end{pmatrix} = \begin{pmatrix} \cos\theta e & -\sin\theta e \\ \sin\theta e & \cos\theta e \end{pmatrix} \begin{pmatrix} Vd \\ Vq \end{pmatrix}$$

where, θe: phase difference between the actual value and estimate value of the rotor angle.

Consequently, a relational expression expressed by equation (27) is induced.

[Equation 27] (27)

$$\frac{d}{dt}\begin{pmatrix} \hat{I}d \\ \hat{I}q \end{pmatrix} = \begin{pmatrix} \cos\theta e & -\sin\theta e \\ \sin\theta e & \cos\theta e \end{pmatrix} \frac{d}{dt}\begin{pmatrix} Id \\ Iq \end{pmatrix} =$$

$$\begin{pmatrix} \cos\theta e & -\sin\theta e \\ \sin\theta e & \cos\theta e \end{pmatrix} \begin{pmatrix} -\frac{r}{Ld} & \omega\frac{Lq}{Ld} \\ -\omega\frac{Ld}{Lq} & -\frac{r}{Lq} \end{pmatrix} \begin{pmatrix} \cos\theta e & \sin\theta e \\ -\sin\theta e & \cos\theta e \end{pmatrix} \begin{pmatrix} \hat{I}d \\ \hat{I}q \end{pmatrix} +$$

$$\begin{pmatrix} \cos\theta e & -\sin\theta e \\ \sin\theta e & \cos\theta e \end{pmatrix} \begin{pmatrix} \frac{1}{Ld} & 0 \\ 0 & \frac{1}{Lq} \end{pmatrix} \left\{ \begin{pmatrix} \cos\theta e & \sin\theta e \\ -\sin\theta e & \cos\theta e \end{pmatrix} \begin{pmatrix} \hat{V}d \\ \hat{V}q \end{pmatrix} - \begin{pmatrix} \omega Ke \\ 0 \end{pmatrix} \right\}$$

Then, similarly to the case of the equation (16) above, in the event that the electric angular velocity ω is substantially 0, influences by changes in induced voltage and angular velocity of the rotor 2 are small, and the voltage drop by the resistors r are negligible, the equation (27) can be approximated by the following equation (28).

[Equation 28] (28)

$$\frac{d}{dt}\begin{pmatrix} \hat{I}d \\ \hat{I}q \end{pmatrix} = \begin{pmatrix} \frac{1}{Ld}\cos^2\theta e + \frac{1}{Lq}\sin^2\theta e & \left(\frac{1}{Ld} - \frac{1}{Lq}\right)\cos\theta e \sin\theta e \\ \left(\frac{1}{Ld} - \frac{1}{Lq}\right)\cos\theta e \sin\theta e & \frac{1}{Ld}\sin^2\theta e + \frac{1}{Lq}\cos^2\theta e \end{pmatrix} \begin{pmatrix} \hat{V}d \\ \hat{V}q \end{pmatrix} =$$

$$\begin{pmatrix} \frac{1}{Ld}\frac{1+\cos 2\theta e}{2} + \frac{1}{Lq}\frac{1-\cos 2\theta e}{2} & \left(\frac{1}{Ld} - \frac{1}{Lq}\right)\frac{\sin 2\theta e}{2} \\ \left(\frac{1}{Ld} - \frac{1}{Lq}\right)\frac{\sin 2\theta e}{2} & \frac{1}{Ld}\frac{1-\cos 2\theta e}{2} + \frac{1}{Lq}\frac{1+\cos 2\theta e}{2} \end{pmatrix} \begin{pmatrix} \hat{V}d \\ \hat{V}q \end{pmatrix} =$$

$$\frac{1}{2}\begin{pmatrix} \left(\frac{1}{Ld} + \frac{1}{Lq}\right) + \left(\frac{1}{Ld} - \frac{1}{Lq}\right)\cos 2\theta e & \left(\frac{1}{Ld} - \frac{1}{Lq}\right)\sin 2\theta e \\ \left(\frac{1}{Ld} - \frac{1}{Lq}\right)\sin 2\theta e & \left(\frac{1}{Ld} + \frac{1}{Lq}\right) + \left(\frac{1}{Ld} - \frac{1}{Lq}\right)\cos 2\theta e \end{pmatrix} \begin{pmatrix} \hat{V}d \\ \hat{V}q \end{pmatrix} \equiv$$

$$\begin{pmatrix} L_0 + L_1\cos 2\theta e & L_1\sin 2\theta e \\ L_1\sin 2\theta e & L_0 - L_1\cos 2\theta e \end{pmatrix} \begin{pmatrix} \hat{V}d \\ \hat{V}q \end{pmatrix}$$

The invention will be described below based on the description that has been made heretofore. The invention relates to a DC brushless motor controller which handles a DC brushless motor by converting the DC brushless motor to an equivalent circuit having a q-axis armature which resides on a q-axis which constitutes a direction of magnetic flux of a field of the motor and a d-axis armature which resides on a d-axis which intersects with the q-axis at right angles, comprising a current detecting unit for detecting current which flows to the armatures of the motor, a dq actual current calculating unit for calculating a q axis actual current which flows to the q axis armature and a d axis actual current which flows to the d axis armature based on a current value detected by the current detecting unit and a rotor angle of the motor, and an energizing control unit for feedback controlling the amount of electrical energy supplied to the armatures of the motor by generating a d axis voltage applied to the d axis armature and a q axis voltage applied to the q axis armature in such a manner as to reduce a q axis current deviation which is a deviation between a q axis command current which is a command value of current flowing to the q axis armature and the q axis actual current and a d axis current deviation which is a deviation between a d axis command current which is a command value of current flowing to the d axis armature and the d axis actual current.

Then, the energizing control unit comprises a reference values calculating unit for feedback controlling the amount of electrical energy supplied to the armatures of the motor in a predetermined control cycle, implementing a unidirectional feedback control which generates a d axis voltage and a q axis voltage in the current control cycle using a d axis actual current and a q axis actual current which are calculated based on an estimate value (θ') of the rotor angle of the motor by the dq actual current calculating unit relative to each of two or more directions which are represented by a linear combination of unit vectors of respective coordinate axes in an orthogonal coordinates system in which the d axis voltage and the q axis voltage constitute coordinate axes thereof and which are not parallel to each other in different control cycles in such a manner that the size of a vector in which the d axis voltage and the q axis voltage which were generated in the previous control cycle constitute components of the vector increases or decreases along the two or more directions according to the d axis current deviation and the q axis current deviation when the vector is projected in the two or more directions, and calculating a sine reference value which corresponds to a sine value of an angle which is twice a phase difference (θ−θ') between an actual value (θ) and an estimate value (θ') of the rotor angle of the motor and a cosine reference value which corresponds to a cosine value of the angle which is twice the phase difference (θ−θ') based on variations of the d axis actual current and the q axis actual current and levels of the d axis voltage and the q axis voltage in a control cycle in which the unidirectional feedback control is implemented to each of the two or more directions, and a rotor angle detecting unit for detecting a rotor angle of the motor based on the sine reference value and the cosine reference value so calculated.

In the invention, assume that the differential time in the equation (28) is the length (ΔT) of the control cycle and that the variations of the d axis actual current and the q axis actual current in the control cycle i that are calculated based on the estimate value (θ^) of the rotor angle by the dq current calculating unit are ΔId^(i), ΔIq^(i), respectively, then the left side of the equation (28) is given by the following equation (29).

[Equation 29] (29)

$$\frac{d}{dt}\begin{pmatrix} \hat{I}d(i) \\ \hat{I}q(i) \end{pmatrix} = \begin{pmatrix} \frac{\Delta \hat{I}d(i)}{\Delta T} \\ \frac{\Delta \hat{I}q(i)}{\Delta T} \end{pmatrix} = \begin{pmatrix} \frac{\hat{I}d(i+1) - \hat{I}d(i)}{\Delta T} \\ \frac{\hat{I}q(i+1) - \hat{I}q(i)}{\Delta T} \end{pmatrix}$$

Thus, assume that the d axis voltage and the q axis voltage in the control cycle i are Vd^(i), Vq^(i), respectively, then the equation (28) can be expressed by the following equation (30).

[Equation 30] (30)

$$\begin{pmatrix} \frac{\Delta \hat{I}d(i)}{\Delta T} \\ \frac{\Delta \hat{I}q(i)}{\Delta T} \end{pmatrix} = \begin{pmatrix} L_0 + L_1\cos 2\theta e & L_1\sin 2\theta e \\ L_1\sin 2\theta e & L_0 - L_1\cos 2\theta e \end{pmatrix} \begin{pmatrix} \hat{V}d(i) \\ \hat{V}q(i) \end{pmatrix}$$

Consequently, when implementing a subtraction between sides of the equation (30) for the control cycle i and sides of the equation (30) for the control cycle i+1, the following equation (31) can be obtained.

[Equation 31] (31)

$$\begin{pmatrix} \frac{\Delta \hat{I}d(i+1)}{\Delta T} - \frac{\Delta \hat{I}d(i)}{\Delta T} \\ \frac{\Delta \hat{I}q(i+1)}{\Delta T} - \frac{\Delta \hat{I}q(i)}{\Delta T} \end{pmatrix} = \begin{pmatrix} L_0 + L_1\cos 2\theta e & L_1\sin 2\theta e \\ L_1\sin 2\theta e & L_0 - L_1\cos 2\theta e \end{pmatrix} \begin{pmatrix} \hat{V}d(i+1) - \hat{V}d(i) \\ \hat{V}q(i+1) - \hat{V}q(i) \end{pmatrix}$$

$$= \begin{pmatrix} L_0 + L_1\cos 2\theta e & L_1\sin 2\theta e \\ L_1\sin 2\theta e & L_0 - L_1\cos 2\theta e \end{pmatrix} \begin{pmatrix} d\hat{V}d(i) \\ d\hat{V}q(i) \end{pmatrix}$$

$$= \begin{pmatrix} d\hat{V}q(i) & d\hat{V}d(i) & d\hat{V}d(i) \\ d\hat{V}d(i) & -d\hat{V}q(i) & d\hat{V}q(i) \end{pmatrix} \begin{pmatrix} L_1\sin 2\theta e \\ L_1\cos 2\theta e \\ L_0 \end{pmatrix}$$

$$\equiv \hat{C}(i)\begin{pmatrix} L_1\sin 2\theta e \\ L_1\cos 2\theta e \\ L_0 \end{pmatrix}$$

where, $\Delta Id^{\wedge}(i+1)$: variation of the d axis actual current in the control cycle (i+1); $\Delta Id^{\wedge}(i)$: variation of the d axis actual current in the control cycle (i); $\Delta Iq^{\wedge}(i+1)$: variation of the q axis actual current in the control cycle (i+1); $\Delta Iq^{\wedge}(i)$: variation of the q axis actual current in the control cycle (i); $dVd^{\wedge}(i)$: variation of the d axis voltage in the control cycle i; $dVq^{\wedge}(i)$: variation of the q axis voltage in the control cycle i.

Consequently, two relational expressions for $L_0$, $L_1 \sin 2\theta e$ and $L_1 \cos 2\theta e$, which are unknowns, can be obtained by substituting the variation of the d axis actual current ($\Delta Id^{\wedge}(i)$), the variation of the q axis actual current $\Delta Iq^{\wedge}(i)$, the variation of the d axis voltage ($dVd^{\wedge}(i)$) and the variation of the q axis voltage ($dVq^{\wedge}(i)$) in the control cycle i, and the variation of the d axis actual current ($\Delta Id^{\wedge}(i+1)$) and the variation of the q axis actual current ($\Delta Iq^{\wedge}(i+1)$) in the control cycle i+1 which follows the control cycle i in the equation (31) above.

Then, when executing the unidirectional feedback control relative to a direction represented by a linear combination of a d axis voltage (Vd) and a q axis voltage (Vq) in the following equation (32), a relational expression in thee form of the equation (31) above can be obtained.

[Equation 32]

$$v = k1 \cdot Vd + k2 \cdot Vq \quad (32)$$

where, k1, k2: combination coefficients.

Consequently, when implementing the unidirectional feedback control relative to the two or more directions which are expressed by the quation (32) and are not parallel to each other in the different control cycles, four or more independent relational expressions can be obtained for the three unknowns, $L_0$, $L_1 \sin 2\theta e$ and $L_1 \cos 2\theta e$. Due to this, $L_1 \sin 2\theta e$ and $L_1 \cos 2\theta e$ can be obtained as the sine reference value and the cosine reference value, respectively, from these relational expressions. Then, an actual value of the rotor angle can be detected by calculating a phase difference ($\theta e$) between the actual value ($\theta$) and the estimate ($\theta^{\wedge}$) of the rotor angle by the following equation (33), for example.

[Equation 33]

$$\theta e = \frac{1}{2} \tan^{-1} \frac{L_1 \sin 2\theta e}{L_1 \cos 2\theta e} \quad (33)$$

Then, according to the invention, since the rotor angle is detected using the variations of the d axis actual current and the q axis actual current and the levels of the d axis voltage and the q axis voltage which are used when executing the motor armature current feedback control, the necessity for imposing a special voltage on the drive voltage of the motor to detect the rotor angle is obviated. Consequently, there is generated no irksome noise that would be generated when imposing the rotor angle detecting high-frequency voltage on the drive voltage. In addition, there is no need to provide a low-pass filter for preventing the interference of the response from the motor current feedback system and the response from the rotor angle detection system.

Note that the response of the motor armature current feedback control system may not be so fast when the motor rotates at low speed. Due to this, it is considered that there would be caused no problem even if the motor armature current feedback control is implemented by implementing the unidirectional feedback control in different control cycles.

In addition, the invention is characterized in that the two or more directions are two coordinate axes directions of the orthogonal coordinates system in which the d axis voltage and the q axis voltage constitute coordinate axes thereof.

According to the invention, when implementing the unidirectional feedback control relative to the axial direction of the d axis voltage, the variation of the q axis voltage in the control cycle in which the unidirectional feedback control is implemented becomes 0. Consequently, when the unidirectional feedback control relative to the axial direction of the d axis voltage is implemented in the control cycle $i_1$, the equation (31) above is expressed in the form of the following equation (34).

[Equation 34]

$$\begin{pmatrix} \frac{\Delta \hat{I}d(i_1+1)}{\Delta T} - \frac{\Delta \hat{I}d(i_1)}{\Delta T} \\ \frac{\Delta \hat{I}q(i_1+1)}{\Delta T} - \frac{\Delta \hat{I}q(i_1)}{\Delta T} \end{pmatrix} = \begin{pmatrix} L_0 + L_1\cos 2\theta e & L_1\sin 2\theta e \\ L_1\sin 2\theta e & L_0 - L_1\cos 2\theta e \end{pmatrix} \begin{pmatrix} d\hat{V}d(i_1) \\ 0 \end{pmatrix}$$

$$= d\hat{V}d(i_1) \begin{pmatrix} 0 & 1 & 1 \\ 1 & 0 & 0 \end{pmatrix} \begin{pmatrix} L_1\sin 2\theta e \\ L_1\cos 2\theta e \\ L_0 \end{pmatrix} \quad (34)$$

On the other hand, when implementing the unidirectional feedback control relative to the axial direction of the q axis voltage, the variation of the d axis voltage in the control cycle in which the unidirectional feedback control is implemented becomes 0. Consequently, when implementing the unidirectional feedback control relative to the axial direction of the q axis voltage in the control cycle $i_2$, the equation (31) above is expressed in the form of the following equation (35).

[Equation 35] (35)

$$\begin{pmatrix} \frac{\Delta \hat{I}d(i_2+1)}{\Delta T} - \frac{\Delta \hat{I}d(i_2)}{\Delta T} \\ \frac{\Delta \hat{I}q(i_2+1)}{\Delta T} - \frac{\Delta \hat{I}q(i_2)}{\Delta T} \end{pmatrix} = \begin{pmatrix} L_0 + L_1\cos2\theta e & L_1\sin2\theta e \\ L_1\sin2\theta e & L_0 - L_1\sin2\theta e \end{pmatrix} \begin{pmatrix} 0 \\ d\hat{V}q(i_2) \end{pmatrix}$$

$$= d\hat{V}q(i_2) \begin{pmatrix} 1 & 0 & 0 \\ 0 & -1 & 1 \end{pmatrix} \begin{pmatrix} L_1\sin2\theta e \\ L_1\cos2\theta e \\ L_0 \end{pmatrix}$$

Due to this, from these equations (34), (35), four simple relational expressions with respect to the three unknowns, $L_0$, $L_1 \sin 2 \theta e$ and $L_1 \cos 2 \theta e$, can be obtained. Then, from these relational expressions, as the sine reference value, $L_1 \sin 2 \theta e$ can easily be calculated, and $L_1 \cos 2 \theta e$ ran easily be calculated as the cosine reference value.

In addition, when the following equation (36) is applied, the equation (34) above can be expressed in the form of the following equation (37), whereas the equation (35) above in the form of the following equation (38).

[Equation 36] (36)

$$dd\hat{I}(i) \equiv \begin{pmatrix} dd\hat{I}d(i) \\ dd\hat{I}q(i) \end{pmatrix} \begin{pmatrix} \frac{\Delta \hat{I}d(i+1)}{\Delta T} - \frac{\Delta \hat{I}d(i)}{\Delta T} \\ \frac{\Delta \hat{I}q(i+1)}{\Delta T} - \frac{\Delta \hat{I}q(i)}{\Delta T} \end{pmatrix}$$

[Equation 37] (37)

$$dd\hat{I}(i_1) = d\hat{V}d(i_1) \begin{pmatrix} 0 & 1 & 1 \\ 1 & 0 & 0 \end{pmatrix} \begin{pmatrix} L_1\sin2\theta e \\ L_1\cos2\theta e \\ L_0 \end{pmatrix}$$

[Equation 38] (38)

$$dd\hat{I}(i_2) = d\hat{V}q(i_2) \begin{pmatrix} 1 & 0 & 0 \\ 0 & -1 & 1 \end{pmatrix} \begin{pmatrix} L_1\sin2\theta e \\ L_1\cos2\theta e \\ L_0 \end{pmatrix}$$

Then, when arranged, the equations (37) and (38) can be expressed in the form of the following equation (39).

[Equation 39] (39)

$$\begin{pmatrix} 0 & 1 & 1 \\ 1 & 0 & 0 \\ 1 & 0 & 0 \\ 0 & -1 & 1 \end{pmatrix} \begin{pmatrix} L_1\sin2\theta e \\ L_1\cos2\theta e \\ L_0 \end{pmatrix} \equiv \tilde{C} \begin{pmatrix} L_1\sin2\theta e \\ L_1\cos2\theta e \\ L_0 \end{pmatrix} = \begin{pmatrix} \frac{dd\hat{I}(i_1)}{d\hat{V}d(i_1)} \\ \frac{dd\hat{I}(i_2)}{d\hat{V}q(i_2)} \end{pmatrix}$$

Consequently, assuming that the sine reference value is Vs^, the cosine reference value is Vc^ and $L_0$ is V1^, the following equation (40) can be obtained from the equation (39). Then, the rotor angle detecting unit can calculate the sine reference value (Vs^) and the cosine reference value (Vc^) easily from the following equation (40).

[Equation 40] (40)

$$\begin{pmatrix} \hat{V}_S \\ \hat{V}_C \\ \hat{V}_i \end{pmatrix} = \begin{pmatrix} L_1\sin2\theta e \\ L_1\cos2\theta e \\ L_0 \end{pmatrix} = (\tilde{C}^t\tilde{C})^{-1}\tilde{C}^t \begin{pmatrix} \frac{dd\hat{I}(i_1)}{d\hat{V}d(i_i)} \\ \frac{dd\hat{I}(i_2)}{d\hat{V}q(i_2)} \end{pmatrix} \equiv \tilde{D} \begin{pmatrix} \frac{dd\hat{I}(i_1)}{d\hat{V}d(i_i)} \\ \frac{dd\hat{I}(i_2)}{d\hat{V}q(i_2)} \end{pmatrix}$$

In addition, by storing data of components of a matrix $D^-$ in the equation (40) above in the memory in advance, the rotor angle detecting unit can calculate the sine reference value (Vs^) and the cosine reference value (Vc^) from simple multiplication and addition of the d axis actual current obtained from the unidirectional feedback control implemented relative to the axial direction of the d axis voltage, $2^{nd}$ order difference of the q axis actual current (d d I^($i_1$)) and the variation (dVd^($i_1$)) and the q axis actual current obtained from the unidirectional feedback control implemented relative to the axial direction of the q axis voltage, $2^{nd}$ order difference of the q axis actual current (d d I^($i_2$)) and the variation (dVq^($i_2$)), and the data of the components of the matrix $D^-$ stored in the memory.

DETAILED DESCRIPTION OF THE INVENTION

Figure 2:
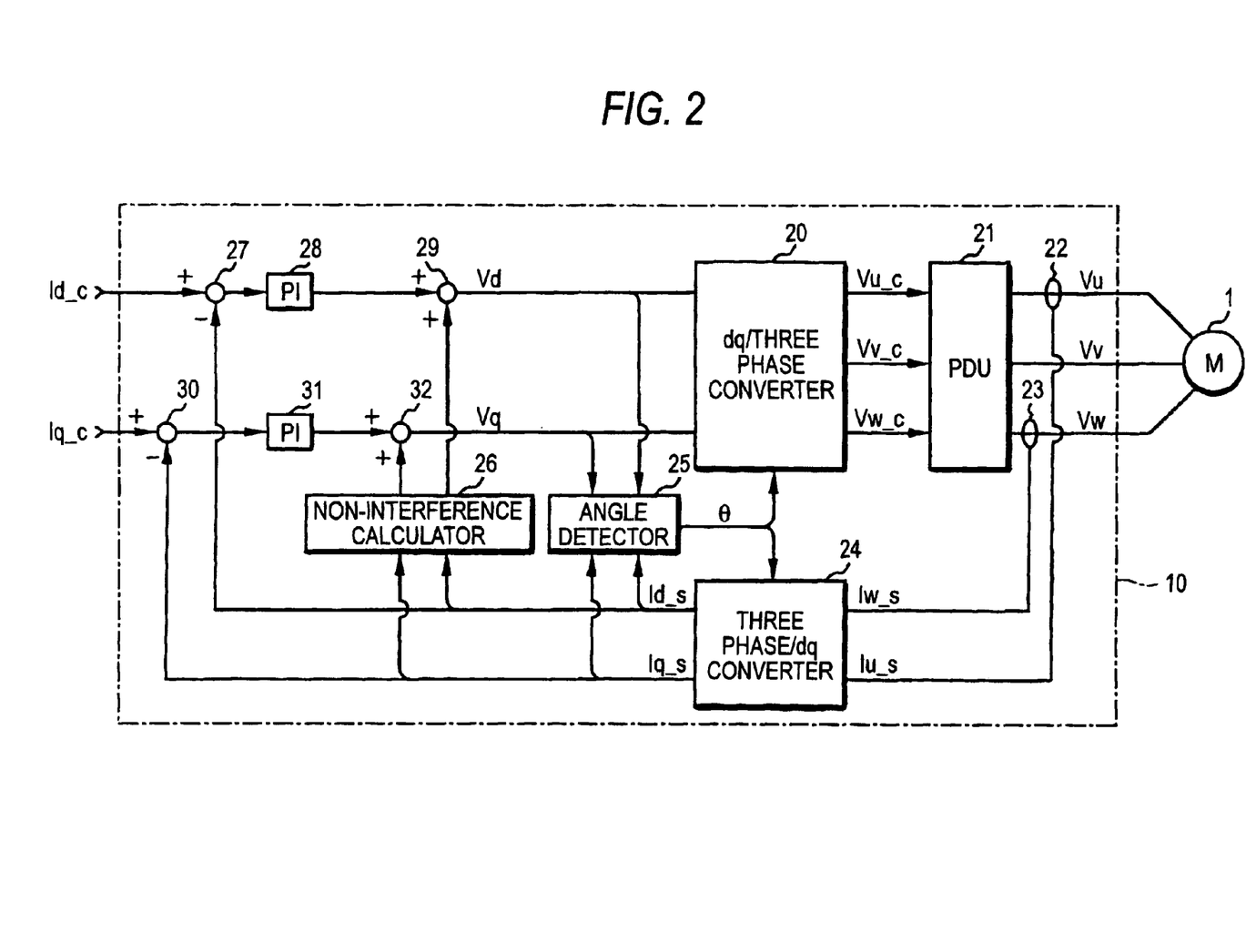
FIG. 2 is a control block diagram of a motor controller for controlling the operation of the DC brushless motor shown in FIGS. 1A and 1B.

Referring to FIGS. 1A to 3, an embodiment of the invention will be described below. FIGS. 1A and 1B are diagrams showing the configuration of a DC brushless motor. FIG. 2 is a control block diagram of a motor controller for controlling the operation of the DC brushless motor. FIGS. 3A and 3B show timing charts of unidirectional feedback controls.

A motor controller 10 shown in FIG. 2 controls current which flows through armatures 3, 4, 5 of a salient pole-type DC brushless motor 1 (hereinafter, simply referred to as a motor 1) shown in FIG. 1 through a feed back loop. The motor controller 10 handles the motor 1 as an equivalent circuit of a dq coordinate system having a q axis armature which resides on a q axis which constitutes a magnetic flux direction of field poles of a rotor 2 and a d axis armature which resides on a d axis which intersects with the q axis at right angles.

Then, the motor controller 10 controls a current (hereinafter, referred to as a d axis current) flowing to the d axis armature and a current flowing to the q axis armature (hereinafter, referred to as a q axis current) through a feed back loop in response to a d axis command current (Id_c) and a q axis command current (Iq_c) respectively.

The motor controller 10 includes a dq/three phase converter 20 and a power drive unit 21. The dg/three phrase converter 20 converts a voltage applied to a d axis armature (hereinafter, referred to as a d axis voltage) and a voltage applied to a q axis armature (hereinafter, referred to as a q axis voltage) to command values (Vu_c, Vv_c, Vw_c) for voltages that are applied to three phases, U, V, W, armatures of a motor 1. The power drive unit 21 comprises an inverter circuit in which a plurality of switching elements are bridge connected so that voltages according to the command values (Vu_c, Vv_c, Vw_c) are applied to the U, V, W armatures of the motor 1, respectively.

Furthermore, the motor controller 10 has a U phase current sensor 22 (corresponding to the current detecting unit of the invention), a W phase current sensor 23 (corresponding to the current detecting unit of the invention), a three phase/dq converter 24 (corresponding to the dq actual current calculating unit of the invention), a angle detector 25 (corresponding to the reference value calculating unit and the rotor angle detecting unit of the invention), and a non-interference calculator 26. The U phase current sensor 22 detects a current flowing to the U phase armature of the motor 1. The W phase current sensor 23 detects a current flowing to the W phase armature of the motor 1. The three phase/dq converter 24 calculates a d axis actual current (Id_s) which is a detected value of the d axis current and a q axis actual current (Iq_s) which is a detected value of the q axis current according to a detected current value (Iu_s) of the U phase current sensor 22 and a detected current value (Iw_s) of the W phase current sensor 23. The angle detector 25 detects a rotor angle (θ) of the motor 1 based on the d axis actual current (Id_s), the q axis actual current (Iq_s), the d axis voltage (Vd) and the q axis voltage (vq). The non-interference calculator 26 implements a process to overcome the influence of speed electromotive forces which interfere with each other between the d axis and the q axis.

In the motor controller 10, a first subtractor 27 substrates the d axis actual current (Id_s) from the d axis command current (Id_c), and a first PI processor 28 performs a PI (Proportional plus Integral) process on the result of the subtraction. A first adder 29 adds an non-interference component to an output signal from the first PI processor 28 to thereby generate a d axis voltage (Vd) according to a deviation between the d axis command current (Id_c) and the d axis actual current (Id_s).

In addition, in the motor controller 10, similarly, a second subtractor 30 subtracts the q axis actual current (Iq_s) from the q axis command current (Iq_c), and a second PI processor 31 performs a PI process on the result of the subtraction. A second adder 32 adds an non-interference component to an output signal from the second PI processor 31 to thereby generate a q axis voltage (Vq) according to a deviation between the q axis command current (Iq_c) and the q axis actual current (Iq_s).

Then, in the motor controller 10, the d axis voltage (Vd) and the q axis voltage (Vq) are supplied to the dq/three phase converter 20. The power drive unit 21 applies three phase Voltages (Vu, Vv, Vw) to the armatures of the motor 1 to control current flowing to the armatures of the motor through a feedback loop in order to reduce the deviation between the d axis command current (Id_c) and the d axis actual current (Id_s) and the deviation between the q axis command current (Iq_c) and the q axis actual current (Iq_s).

The first subtractor 27, the first PI processor 28, the first adder 29, PI processor 31, dq/three phase converter 20, and the power drive unit 21 constitutes the energizing control unit of the invention.

Here, in converting the d axis voltage (Vd) and the q axis voltage (Vq) to voltage commands (Vu_c, Vv_c, Vw_c) by the dq/three phase converter 20, the rotor angle (θ) of the motor 1 is required. In addition, also in converting a detected current value (Iu_s) of the U phase current sensor 22 and a detected current value (Iw_s) of the W phase current sensor 23 to the d axis actual current (Id_s) and the q axis actual current (Iq_s) by the three phase/dq converter 24, the rotor angle (θ) of the motor 1 is required.

Figure 3A:
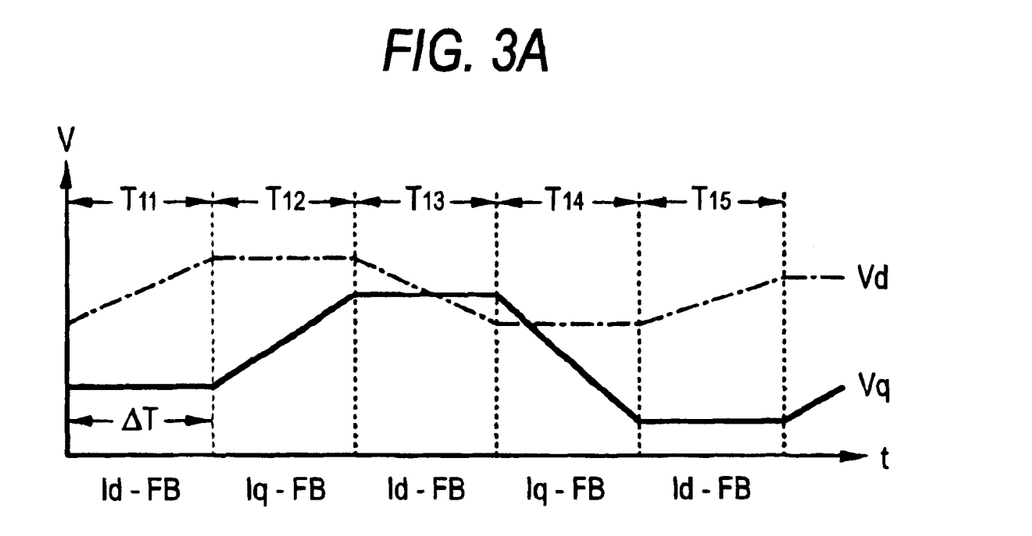
FIGS. 3A and 3B are timing charts of unidirectional feedback control.
Figure 3B:
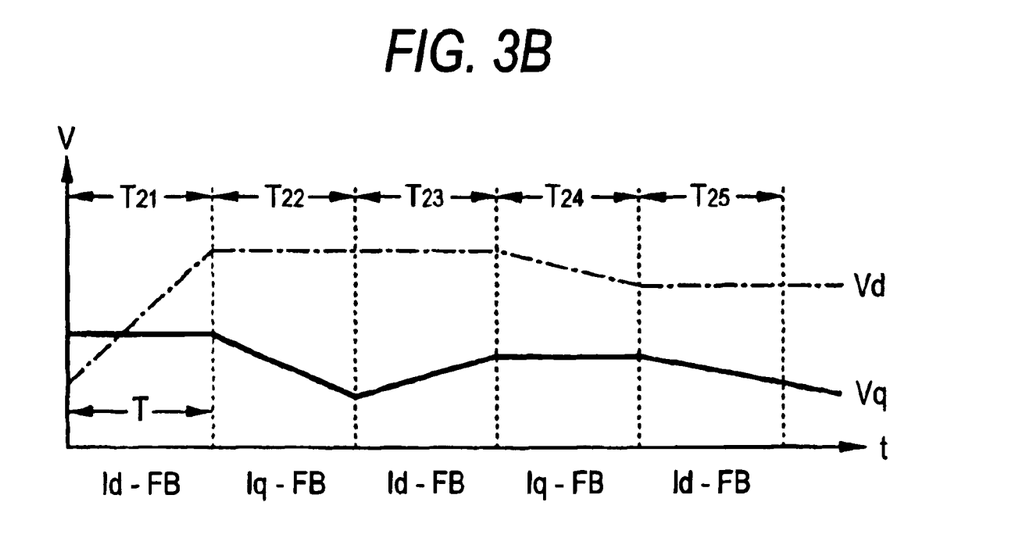

Then, the motor controller 10 detects a rotor angle (θ) without using a position detecting sensor such as a resolver by implementing a feedback control (corresponding to the unidirectional feedback control of the invention) only for a d axis current and a feedback control (corresponding to the unidirectional feedback control of the invention) only for a q axis in different control cycles. Referring to FIGS. 3A and 3B, the process of detecting a rotor angle (θ) by the motor controller 10 will be described below.

FIGS. 3A and 3B show timing charts of unidirectional feedback controls of a d axis current and a q axis current executed by the motor controller 10, and the axis of ordinates denotes voltage (V) and the axis of abscissas denotes time (t).

As shown in FIG. 3A, the motor controller 10 implements a feedback control only for d axis current (Id_FB in the figure) and a feedback control only for q axis current (Iq_FB in the figure) alternately in a predetermined control cycle. In an example shown in FIG. 3A, the feedback control only for the d axis current is implemented in control cycles $T_{11}$, $T_{13}$, $T_{15}$ whereas the feedback control only for the q axis current is implemented in control cycles $T_{12}$, $T_{14}$.

Here, when detecting the rotor angle of the motor 1, the angle detector 25 outputs an estimate value (θ^) of the rotor angle to the dq/three phase converter 20 and the three phase/dq converter 24. Then, using the estimate value (θ^), the dq/three phase converter 20 calculates voltage command values (Vu_c, Vv_c, Vw_c) for the three phases, and the three phase/dq converter 24 calculates a d axis actual current (Id_s) and a q axis actual current (Iq_s).

Then, in the control cycles ($T_{11}$, $T_{13}$, $T_{15}$) in which the feedback control is implemented only for the d axis current, the q axis voltage (Vq) remains unchanged because the voltage in the previous control cycle is maintained. Due to this, when the feedback control using the estimate value (θ^) of the rotor angle is implemented only for the d axis current in the control cycle $i_1$, the relation in the equation (34) above is established.

In addition, in the control cycles ($T_{12}$, $T_{14}$) in which the feedback control is implemented only for the q axis current, the d axis voltage (Vd) remains unchanged because the voltage in the previous control cycle is maintained. Due to this, when the feedback control using the estimate value (θ^) of the rotor angle is implemented only for the q axis current in the control cycle i$_2$, the relation in the equation (35) above is established.

Then, the angle detector 25 executes an operation of the equation (40) above which is obtained from the equations (34), (35) and calculates a sine reference value (Vs^=L$_1$ sin 2 θe) and a cosine reference value (Vc^=L$_1$ cos 2 θe) which correspond to an angle which is twice the phase difference (θe) between the actual value (θ) and the estimate value (θ^) of the rotor angle.

Here, when calculating the matrix D⁻ of the equation (40), the following equation (41) results.

[Equation 41] (41)

$$\begin{pmatrix} \hat{V}_s \\ \hat{V}_c \\ \hat{V}_i \end{pmatrix} = \tilde{D} \begin{pmatrix} \frac{d d\hat{I}(i_1)}{d\hat{V}d(i_1)} \\ \frac{d d\hat{I}(i_2)}{d\hat{V}q(i_2)} \end{pmatrix} = \begin{pmatrix} 0 & 0.5 & 0.5 & 0 \\ 0.5 & 0 & 0 & -0.5 \\ 0.5 & 0 & 0 & 0.5 \end{pmatrix} \begin{pmatrix} \frac{d d\hat{I}(i_1)}{d\hat{V}d(i_1)} \\ \frac{d d\hat{I}(i_2)}{d\hat{V}q(i_2)} \end{pmatrix}$$

Then, the data of the components of the matrix D_ in the equation (41) are stored in a memory (not shown) of the motor controller 10 in advance. Then, the angle detector 25 reduces time for calculating the reference value (Vs^) and the cosine reference value (Vc^) by performing an operation of the equation (41) using the component data.

Then, the angle detector 25 calculates from the equation (33) a phase difference (θe) between the actual value (θ) and the estimate value (θ^) of the rotor angle to thereby detect an actual value (θ=θ^+θe).

Note that it is possible to modify using the phase difference (θe) through a follow-up operation by an observer such that an estimated error of the estimate value (θ^) of the rotor angle is converged to 0. The modification process of the estimate value (θ^) of the rotor angle by the observer will be described below.

Assuming that the motor 1 rotates at a certain angular velocity, the relation between the rotor angle (θ) and the angular velocity (ω) every control cycle (ΔT) is expressed by the following equation (42).

[Equation 42] (42)

$$\begin{pmatrix} \theta(n+1) \\ \omega(n+1) \end{pmatrix} = \begin{pmatrix} 1 & \Delta T \\ 0 & 1 \end{pmatrix} \begin{pmatrix} \theta(n) \\ \omega(n) \end{pmatrix}$$

where, θ(n) and ω(n) denote the rotor angle and the angular velocity in a certain control cycle, respectively, and θ(n+1) and ω(n+1) denote the rotor angle and the angular velocity in a control cycle that follows the certain control cycle, respectively.

Then, an estimate value (θ^) of the rotor angle and an estimate value (ω^) of the angular velocity are inputted into a model simulator which is expressed by the equation (42), and a phase difference (θe) between the actual value (θ) and the estimate value (θ^) is multiplied by a gain from operation gains K1, K2, K⁻, which operations are expressed by the following equation (43) or (44).

[Equation 43] (43)

$$\begin{pmatrix} \hat{\theta}(n+1) \\ \hat{\omega}(n+1) \end{pmatrix} = \begin{pmatrix} 1 & \Delta T \\ 0 & 1 \end{pmatrix} \begin{pmatrix} \hat{\theta}(n) \\ \hat{\omega}(n) \end{pmatrix} + \begin{pmatrix} K1 \\ K2 \end{pmatrix} \tilde{K}(\theta e(n))$$

$$= \begin{pmatrix} 1 & \Delta T \\ 0 & 1 \end{pmatrix} \begin{pmatrix} \hat{\theta}(n) \\ \hat{\omega}(n) \end{pmatrix} + \begin{pmatrix} K1 \\ K2 \end{pmatrix} \tilde{K} \frac{1}{2} \tan^{-1} \frac{\hat{V}_s}{\hat{V}_c}$$

[Equation 44] (44)

$$\begin{pmatrix} \hat{\theta}(n+1) \\ \hat{\omega}(n+1) \end{pmatrix} = \begin{pmatrix} 1 & \Delta T \\ 0 & 1 \end{pmatrix} \begin{pmatrix} \hat{\theta}(n) \\ \hat{\omega}(n) \end{pmatrix} + \begin{pmatrix} K1 \\ K2 \end{pmatrix} \tilde{K}(\theta e(n))$$

$$= \begin{pmatrix} 1 & \Delta T \\ 0 & 1 \end{pmatrix} \begin{pmatrix} \hat{\theta}(n) \\ \hat{\omega}(n) \end{pmatrix} + \begin{pmatrix} K1 \\ K2 \end{pmatrix} \tilde{K} \frac{\hat{V}_s}{\sqrt{\hat{V}_s^2 + \hat{V}_c^2}} (\theta e(n) \approx 0)$$

The equations (43), (44) above constitute an observer for a steady rotation motor model in which a feedback by the phase difference is carried out on the assumption that the motor of the simulator rotates at a constant angular velocity. Then, the estimate value (θ^) of the rotor angle can be converged to the actual value (θ) thereof by the equations (43), (44).

Note that since the square operation of the equation (44) takes time, the following equation (45) may be used for approximation.

[Equation 45] (45)

$$\frac{\hat{V}_s}{\sqrt{\hat{V}_s^2 + \hat{V}_c^2}} \approx \begin{cases} \frac{\hat{V}_s}{|\hat{V}_s|} (|\hat{V}_s| > |\hat{V}_c|) \\ \frac{\hat{V}_s}{|\hat{V}_c|} (|\hat{V}_c| > |\hat{V}_s|) \end{cases}$$

In addition, in the equations (43), (44), as shown by the following equation (46), the phase of an estimate value (θ^) of the rotor angle that is to be calculated may forcibly be shifted by applying an offset so as to reduce a detection error of the rotor angle.

[Equation 46] (46)

$$\begin{pmatrix} \hat{\theta}(n+1) \\ \hat{\omega}(n+1) \end{pmatrix} = \begin{pmatrix} 1 & \Delta T \\ 0 & 1 \end{pmatrix} \begin{pmatrix} \hat{\theta}(n) \\ \hat{\omega}(n) \end{pmatrix} + \begin{pmatrix} K1 \\ K2 \end{pmatrix} \tilde{K}(\theta e(n) + \text{offset})$$

In addition, while the feedback control only for the d axis current and the feedback control only for the q axis current are executed alternately in one control cycle, as shown in FIG. 3A, in this embodiment, with a control cycle in which only the d axis voltage changes and the variation of the q axis voltage becomes 0 and a control cycle in which only the q axis voltage changes and the variation of the d axis voltage becomes 0, the sine reference value (Vs^) and the cosine reference value (Vc^) can be calculated.

To this end, for example, as shown in FIG. 3B, the feedback control only for the q axis current may be executed continuously over two control cycles after the feedback control only for the d axis current.

In addition, while the unidirectional feedback control according to the invention is executed relative to the axial direction of the d axis voltage and the axial direction of the q axis voltage in the embodiment, there is no specific reason why the direction of the unidirectional feedback control has to be limited to these directions. Namely, the sine reference value (Vs^) and the cosine reference value (Vc^) can be calculated by implementing the unidirectional feedback control relative to the two or more directions (v) which are expressed by the linear combination of the d axis voltage (Vd) and the q axis voltage (Vq) shown in the equation (32) and which are not parallel to each other.

Referring to FIG. 2, when ignoring the function of the non-interference calculator 26, a d axis voltage (Vd_new) and a q axis voltage (Vq_new) in a certain control cycle are calculated by the following equations (47), (48).

[Equation 47]

$$Vd\_new = Kp(Id\_c - Id\_s) + Ki \int (Id\_c - Id\_s) dt \quad (47)$$

[Equation 48]

$$Vq\_new = Kp(Iq\_c - Iq\_s) + Ki \int (Iq\_c - Iq\_s) dt \quad (48)$$

where, Kp: proportional gain coefficient; Ki: integral gain coefficient.

To this end, assume that the d axis voltage and the q axis voltage which were generated in the previous control cycle are Vd_old, Vq_old, respectively, the variation (dVd') of the d axis voltage and the variation (dVq') of the q axis voltage in the current control cycle are expressed by the following equations (49), (50).

[Equation 49]

$$dVd' = Vd\_new - Vd\_old \quad (49)$$

[Equation 50]

$$dVq' = Vq\_new - Vq\_old \quad (50)$$

Here, a vector whose components are made up of the variation (dVd') of the d axis voltage and the variation (dVq') of the q axis voltage which are expressed by the equations (49), (50) can take an arbitrary direction. Due to this, in order to implement a current feedback control relative to the direction (v) expressed by the equation (32) only, firstly, a projective component (dV) of the variation (dVd') of the d axis command voltage and the variation (dVq') of the q axis command voltage to the direction (v) is obtained from the following equation (51).

[Equation 51] (51)

$$dV = \frac{1}{\sqrt{k_1^2 + k_2^2}} (k_1 \quad k_2) \begin{pmatrix} d\hat{V}d' \\ d\hat{V}q' \end{pmatrix}$$

Then, a d axis voltage (Vd) and a q axis voltage (Vq) in the current control cycle may be calculated from the following equations (52), (53).

[Equation 52] (52)

$$Vd = Vd\_old + \frac{k_1}{\sqrt{k_1^2 + k_2^2}} dV$$

[Equation 53] (53)

$$Vq = Vq\_old + \frac{k_2}{\sqrt{k_1^2 + k_2^2}} dV$$

Thus, as has been described heretofore, it is easy to reflect the results of the current feedback only to the directions represented by the linear combination of the d axis voltage and the q axis voltage. Then, in the event that the current feedback is implemented relative to the two or more directions which are not parallel to each other, the d axis current and the q axis current can be controlled on arbitrary points on the plane of the dq coordinates.

A method will be described below for calculating the sine reference value (Vs^) and the cosine reference value (Vc^) when the current feedback control is carried out relative to each of n directions (n≧2) from v1 to vn in different control cycles.

In a case where the respective directions (v1 to vn) are represented by the linear combination of the d axis voltage (Vd) and the q axis voltage (Vq) from the following equation (54), the following equation (55) is established from the equation (31) above relative to an arbitrary j (1≦j≦n).

[Equation 54] (54)

$$\begin{pmatrix} v_1 \\ v_2 \\ \vdots \\ v_n \end{pmatrix} = \begin{pmatrix} k_{11} & k_{12} \\ k_{21} & k_{22} \\ \vdots \\ k_{n1} & k_{n2} \end{pmatrix} \begin{pmatrix} Vd \\ Vq \end{pmatrix}$$

[Equation 55] (55)

$$dd\hat{I}(j) = \frac{dv(j)}{\sqrt{kj_1^2 + kj_2^2}} \begin{pmatrix} kj_2 & kj_1 & kj_1 \\ kj_1 & -kj_2 & kj_2 \end{pmatrix} \begin{pmatrix} L_1 \sin 2\theta e \\ L_1 \cos 2\theta e \\ L_0 \end{pmatrix} \equiv \hat{c}(j) \begin{pmatrix} L_1 \sin 2\theta e \\ L_1 \cos 2\theta e \\ L_0 \end{pmatrix}$$

where, dv(j) in the equation (55) is expressed by the following equation (56).

[Equation 56] (56)

$$dv(j) = \frac{1}{\sqrt{kj_1^2 + kj_2^2}} (kj_1 \quad kj_2) \begin{pmatrix} Vd\_new - Vd\_old \\ Vq\_new - Vq\_old \end{pmatrix}$$

Consequently, when arranging the equarion (56) above relative to the respective direction (v1 to vn), the following equation (57) is obtained, and by rearranging the equation (57), the following equation (58) is obtained.

[Equation 57] (57)

$$\begin{pmatrix} \hat{C}(1) \\ \vdots \\ \hat{C}(j) \\ \vdots \\ \hat{C}(n) \end{pmatrix} \begin{pmatrix} L_1\sin2\theta e \\ L_1\cos2\theta e \\ Lo \end{pmatrix} \equiv \tilde{C} \begin{pmatrix} L_1\sin2\theta e \\ L_1\cos2\theta e \\ Lo \end{pmatrix} \begin{pmatrix} dd\hat{I}(1)/dv(1) \\ \vdots \\ dd\hat{I}(j)/dv(j) \\ \vdots \\ dd\hat{I}(n)/dv(n) \end{pmatrix}$$

[Equation 58] (58)

$$\begin{pmatrix} \hat{V}_S \\ \hat{V}_C \\ \hat{V}_i \end{pmatrix} = \begin{pmatrix} L_1\sin2\theta e \\ L_1\cos2\theta e \\ Lo \end{pmatrix} = (\tilde{C}^t \tilde{C})^{-1} \tilde{C}^t \begin{pmatrix} dd\hat{I}(1)/dv(1) \\ \vdots \\ dd\hat{I}(j)/dv(j) \\ \vdots \\ dd\hat{I}(n)/dv(n) \end{pmatrix}$$

$$\equiv \tilde{D} \begin{pmatrix} dd\hat{I}(1)/dv(1) \\ \vdots \\ dd\hat{I}(j)/dv(j) \\ \vdots \\ dd\hat{I}(n)/dv(n) \end{pmatrix}$$

Then, by substituting $2^{nd}$ order differences d d I^(1) to d d I^(n) of the d axis actual current and the q axis current and variations dv(1) to dv(n) of the d axis voltage and the q axis voltage when implementing the current feedback control relative to the respective directions (v1 to vn) in the different control cycles in the equation (58), the sine reference value (Vs^) and the cosine reference value (Vc^) can be calculated.

For example, in the event that the unidirectional feedback control according to the invention is implemented relative to two directions, when selecting another two directions represented by the following equation (59) in addition to the aforesaid axial directions of the d axis voltage and the q axis voltage, matrices C⁻ and D⁻ in the equation (58) above are expressed by the following equations (60), (61), respectively.

[Equation 59] (59)

$$\begin{pmatrix} v1 \\ v2 \end{pmatrix} = \begin{pmatrix} 1 & 1 \\ 1 & -1 \end{pmatrix} \begin{pmatrix} Vd \\ Vq \end{pmatrix}$$

[Equation 60] (60)

$$\tilde{C} = \begin{bmatrix} 1 & 1 & 1 \\ 1 & -1 & 1 \\ -1 & 1 & 1 \\ 1 & 1 & -1 \end{bmatrix}$$

[Equation 61] (61)

$$\tilde{D} = \frac{1}{\sqrt{2}} \begin{pmatrix} 0.25 & 0.25 & -0.25 & 0.25 \\ 0.25 & -0.25 & 0.25 & 0.25 \\ 0.25 & 0.25 & 0.25 & -0.25 \end{pmatrix}$$

In addition, in the event that the unidirectional feedback control is implemented relative to three directions expressed by the following equation (62), the matrices C⁻ and D⁻ in the equation (58) above are expressed by the following equations (63), (64), respectively.

[Equation 62] (62)

$$\begin{pmatrix} v1 \\ v2 \\ v3 \end{pmatrix} = \begin{pmatrix} 1 & 0 \\ 1 & 1 \\ 0 & 1 \end{pmatrix} \begin{pmatrix} Vd \\ Vq \end{pmatrix}$$

[Equation 63] (63)

$$\tilde{C} = \begin{bmatrix} 0 & 1 & 1 \\ 1 & 0 & 0 \\ 1 & 1 & 1 \\ 1 & -1 & 1 \\ 1 & 0 & 0 \\ 0 & -1 & 1 \end{bmatrix}$$

[Equation 64] (64)

$$\tilde{D} = \begin{pmatrix} -\frac{1}{6} & \frac{1}{3} & \frac{1}{6} & \frac{1}{6} & \frac{1}{3} & -\frac{1}{6} \\ \frac{\sqrt{2}}{8} & 0 & \frac{\sqrt{2}}{8} & -\frac{\sqrt{2}}{8} & 0 & +\frac{\sqrt{2}}{8} \\ \frac{1}{3} & -\frac{1}{6} & \frac{1}{6} & \frac{1}{6} & -\frac{1}{6} & \frac{1}{3} \end{pmatrix}$$

Note that there is a possibility that depending on electrical or mechanical parameters of the motor 1, sufficient variations for calculation of the sine reference value (Vs) and the cosine reference value (Vc) cannot be generated only by the response of the current feedback system. In this case, a certain means needs to be devised to deal with the problem. For example, random numbers are added to the d axis command current (Id_c) and q axis command current (Iq_c) or the control cycle (ΔT) is made longer, so that sufficient d axis actual current (Id_s) and q axis actual current (Iq_s) variations can be generated.

What is claimed is:

1. A DC brushless motor controller which handles a DC brushless motor by converting the DC brushless motor to an equivalent circuit having a q-axis armature which resides on a q-axis which constitutes a direction of magnetic flux of a field of the motor and a d-axis armature which resides on a d-axis which intersects with the q-axis at right angles, the controller comprising:

a current detecting unit for detecting current which flows to the armatures of the motor;

a dq actual current calculating unit for calculating a q axis actual current which flows to the q axis armature and a d axis actual current which flows to the d axis armature based on a current value detected by the current detecting unit and a rotor angle of the motor; and an energizing control unit for feedback controlling the amount of electrical energy supplied to the armatures of the motor by generating a d axis voltage applied to the d axis armature and a q axis voltage applied to the q axis armature in such a manner as to reduce a q axis current deviation which is a deviation between a q axis command current which is a command value of current flowing to the q axis armature and the q axis actual current and a d axis current deviation which is a deviation between a d axis command current which is a command value of current flowing to the d axis armature and the d axis actual current, the energizing control unit including a reference values calculating unit for feedback controlling the amount of electrical energy supplied to the armatures of the motor in a predetermined control cycle, implementing a unidirectional feedback control which generates a d axis voltage and a q axis voltage in the current control cycle using the d axis actual current and the q axis actual current which are calculated based on an estimate value (θ') of the rotor angle of the motor by the dq actual current calculating unit relative to each of two or more directions which are represented by a linear combination of unit vectors of respective coordinate axes in an orthogonal coordinates system in which the d axis voltage and the q axis voltage constitute coordinate axes thereof and which are not parallel to each other in different control cycles in such a manner that the size of a vector in which the d axis voltage and the q axis voltage which were generated in the previous control cycle constitute components of the vector increases or decreases along the two or more directions according to the d axis current deviation and the q axis current deviation when the vector is projected in the two or more directions, and calculating a sine reference value which corresponds to a sine value of an angle which is twice a phase difference (θ−θ') between an actual value (θ) and an estimate value (θ') of the rotor angle of the motor and a cosine reference value which corresponds to a cosine value of the angle which is twice the phase difference (θ−θ') based on variations of the d axis actual current and the q axis actual current and levels of the d axis voltage and the q axis voltage in a control cycle in which the unidirectional feedback control is implemented to each of the two or more directions, and a rotor angle detecting unit for detecting a rotor angle of the motor based on the sine reference value and the cosine reference value so calculated.

2. A DC brushless motor controller as set forth in claim 1, wherein the two or more directions are two coordinate axes directions of the orthogonal coordinates system in which the d axis voltage and the q axis voltage constitute coordinate axes thereof.

3. A DC brushless motor controller as set forth in claim 2, wherein the rotor angle detecting unit calculates the sine reference value and the cosine reference value by the following equations (1) to (7),

[Equation 1]

$$\begin{pmatrix} \hat{V}s \\ \hat{V}c \\ \hat{V}l \end{pmatrix} = \begin{pmatrix} L_1 \sin 2\theta e \\ L_1 \cos 2\theta e \\ Lo \end{pmatrix} = (\tilde{C}^t \tilde{C})^{-1} C^t \begin{pmatrix} dd\hat{I}(i_1) \\ d\hat{V}d(i_1) \\ dd\hat{I}(i_2) \\ d\hat{V}q(i_2) \end{pmatrix} \equiv \tilde{D} \begin{pmatrix} dd\hat{I}(i_1) \\ d\hat{V}d(i_1) \\ dd\hat{I}(i_2) \\ d\hat{V}q(i_2) \end{pmatrix} \quad (1)$$

[Equation 2]

$$L_1 = \frac{1}{2}\left(\frac{1}{Ld} - \frac{1}{Lq}\right) \quad (2)$$

[Equation 3]

$$L_o = \frac{1}{2}\left(\frac{1}{Ld} - \frac{1}{Lq}\right) \quad (3)$$

[Equation 4]

$$\tilde{C} = \begin{pmatrix} 0 & 1 & 1 \\ 1 & 0 & 0 \\ 1 & 0 & 0 \\ 0 & -1 & 1 \end{pmatrix} \quad (4)$$

[Equation 5]

$$dd\hat{I}d(i) = \begin{pmatrix} \frac{\Delta \hat{I}d(i+1)}{\Delta T} - \frac{\Delta \hat{I}d(i)}{\Delta T} \\ \frac{\Delta \hat{I}q(i+1)}{\Delta T} - \frac{\Delta \hat{I}q(i)}{\Delta T} \end{pmatrix} \quad (5)$$

$$= \begin{pmatrix} \frac{\hat{I}d(i+2) - \hat{I}d(i+1)}{\Delta T} - \frac{\hat{I}d(i+1) - \hat{I}d(i)}{\Delta T} \\ \frac{\hat{I}q(i+2) - \hat{I}q(i+1)}{\Delta T} - \frac{\hat{I}q(i+1) - \hat{I}q(i)}{\Delta T} \end{pmatrix}$$

[Equation 6]

$$d\hat{V}d(i) = \hat{V}d(i+1) - \hat{V}d(i) \quad (6)$$

[Equation 7]

$$d\hat{V}q(i) = \hat{V}q(i+1) - \hat{V}q(i) \quad (7)$$

where, Vs^: sine reference value, Vc^: cosine reference value, $i_1$: control cycle in which the unidirectional feedback control is implemented relative to the d axis; $i_2$: control cycle in which the unidirectional feedback control is implemented relative to the q axis; Ld: inductance of the d axis armature; Lq: inductance of the q axis armature; ΔT: control cycle time; ΔId^(i) variation of the d axis actual current in a control cycle i; ΔIq^(i): variation of the q axis actual current in the control cycle i; Id^(i): the d axis actual current in a control cycle i; Iq^(i): the q axis actual current in the control cycle i; dVd^(i): variation of the d axis voltage in the control cycle i; Vd^(i): d axis voltage in the control cycle i; dVq^(i) variation of the q axis voltage in the control cycle i; Vq^(i): q axis voltage in the control i.

4. A DC brushless motor controller as set forth in claim 3, wherein data of components of a matrix D⁻ in the equation (1) are stored in a memory in advance, and wherein the rotor angle detecting unit executes an operation of the equation (1) using the data of the components of the matrix D⁻ stored in the memory.

* * * * *